(12) United States Patent
Nakamura et al.

(10) Patent No.: US 10,252,576 B2
(45) Date of Patent: Apr. 9, 2019

(54) PNEUMATIC TIRE

(71) Applicant: BRIDGESTONE CORPORATION, Chuo-ku, Tokyo (JP)

(72) Inventors: Takamitsu Nakamura, Kodaira (JP); Takahiro Kawahara, Kodaira (JP)

(73) Assignee: BRIDGESTONE CORPORATION, Chuo-ku, Tokyo (JP)

( * ) Notice: Subject to any disclaimer, the term of this patent is extended or adjusted under 35 U.S.C. 154(b) by 885 days.

(21) Appl. No.: 14/368,620

(22) PCT Filed: Dec. 21, 2012

(86) PCT No.: PCT/JP2012/083344
§ 371 (c)(1),
(2) Date: Jun. 25, 2014

(87) PCT Pub. No.: WO2013/099820
PCT Pub. Date: Jul. 4, 2013

(65) Prior Publication Data
US 2015/0020937 A1 Jan. 22, 2015

(30) Foreign Application Priority Data

Dec. 27, 2011 (JP) ................................ 2011-286672
Dec. 27, 2011 (JP) ................................ 2011-286674

(51) Int. Cl.
*B60C 11/03* (2006.01)
*B60C 11/13* (2006.01)
(Continued)

(52) U.S. Cl.
CPC .......... *B60C 11/0304* (2013.01); *B60C 11/01* (2013.01); *B60C 11/042* (2013.01);
(Continued)

(58) Field of Classification Search
CPC ............. B60C 11/0304; B60C 11/1369; B60C 11/1353; B60C 11/12; B60C 11/1204;
(Continued)

(56) References Cited

U.S. PATENT DOCUMENTS 3,055,410 A * 9/1962 Caulkins ............. B60C 11/0309
152/209.21
4,884,607 A * 12/1989 Mori ................... B60C 11/0302
152/209.18
(Continued)

FOREIGN PATENT DOCUMENTS

EP 2045104 A1 4/2009
EP 2100752 A1 9/2009
(Continued)

OTHER PUBLICATIONS

Communication dated Oct. 28, 2015 from the State Intellectual Property Office of the People's Republic of China in counterpart application No. 201280064859.8.
(Continued)

*Primary Examiner* — Steven D Maki
*Assistant Examiner* — Philip N Schwartz
(74) *Attorney, Agent, or Firm* — Sughrue Mion, PLLC

(57) ABSTRACT

An outer side rib 46 is formed at a side relative to the plural circumference direction main grooves that is at the vehicle outer side when the tire is mounted at a vehicle. A land portion of the outer side rib 46 is continuous in the tire circumference direction. Of the plural circumference direction main grooves, an outermost side circumference direction main groove 24 is formed at the vehicle outermost side when the tire is mounted. Fourth lug grooves 42 extend from the outermost side circumference direction main groove 24 toward the outer side rib 46. The groove width of each fourth lug groove 42 widens from the outermost side circumference
(Continued)

direction main groove 24 side toward the outer side rib 46 side. The fourth lug grooves 42 terminate at the outermost side circumference direction main groove 24 side relative to a tire ground contact edge 16E.

<p align="center">5 Claims, 9 Drawing Sheets</p>

(51) Int. Cl.
      *B60C 11/01*       (2006.01)
      *B60C 11/04*       (2006.01)
      *B60C 11/12*       (2006.01)

(52) U.S. Cl.
      CPC .......... *B60C 11/1236* (2013.01); *B60C 11/13* (2013.01); *B60C 2011/0348* (2013.01); *B60C 2011/0351* (2013.01); *B60C 2011/0367* (2013.01); *B60C 2011/0369* (2013.01); *B60C 2011/0381* (2013.01); *B60C 2011/0388* (2013.01); *B60C 2011/0393* (2013.01)

(58) Field of Classification Search
      CPC ............. B60C 11/1218; B60C 11/1222; B60C 11/1236; B60C 11/1281; B60C 11/13; B60C 11/042; B60C 11/01; B60C 2011/0381; B60C 2011/0348; B60C 2011/0367; B60C 2011/0351; B60C 2011/0388; B60C 2011/0393
      USPC ................. 152/209.8, 209.9, 209.27, 209.22
      See application file for complete search history.

(56) References Cited

U.S. PATENT DOCUMENTS

| | | | | |
|---|---|---|---|---|
| 5,733,393 | A | * 3/1998 | Hubbell | B60C 11/00 152/154.2 |
| 2003/0024621 | A1 | * 2/2003 | Neugebauer | B60C 11/11 152/209.22 |
| 2006/0157179 | A1 | * 7/2006 | Bito | B60C 11/0311 152/209.19 |
| 2007/0215258 | A1 | 9/2007 | Fukunaga | |
| 2009/0114325 | A1 | 5/2009 | Ishizaka | |
| 2010/0096053 | A1 | * 4/2010 | Nagai | B60C 11/0306 152/209.9 |
| 2010/0175799 | A1 | * 7/2010 | Takahashi | B60C 11/0309 152/209.3 |
| 2010/0186861 | A1 | * 7/2010 | Ishiguro | B60C 11/0306 152/209.25 |
| 2011/0048601 | A1 | 3/2011 | Fukunaga | |

FOREIGN PATENT DOCUMENTS

| | | | | |
|---|---|---|---|---|
| EP | 2127909 A1 | 12/2009 | | |
| EP | 2151333 A1 | 2/2010 | | |
| GB | 280669 A | * 11/1927 | ......... | B60C 11/0306 |
| JP | 8-300909 A | 11/1996 | | |
| JP | 2000-43514 A | 2/2000 | | |
| JP | 2006-151029 A | 6/2006 | | |
| JP | 2006-218901 A | 8/2006 | | |
| JP | 2007-8342 A | 1/2007 | | |
| JP | 2007237795 A | 9/2007 | | |
| JP | 2009-6833 A | 1/2009 | | |
| JP | 2009-113544 A | 5/2009 | | |
| JP | 2009-214699 A | 9/2009 | | |
| JP | 2010-58781 A | 3/2010 | | |
| JP | 2010-285152 A | 12/2010 | | |
| JP | 2011-156941 A | 8/2011 | | |
| WO | 2011093452 A1 | 8/2011 | | |

OTHER PUBLICATIONS

Communication dated Aug. 10, 2015 from the European Patent Office issued in corresponding application No. 12861626.5.
Communication dated Aug. 4, 2015 from the Japanese Patent Office in counterpart application No. 2011-286674.
Communication dated Jul. 28, 2015 from the Japanese Patent Office in counterpart application No. 2011-286672.
International Search Report for PCT/JP2012/083344 dated Mar. 5, 2013.
Communication dated Dec. 4, 2015, from the European Patent Office in counterpart European Application No. 12861626.5.

\* cited by examiner

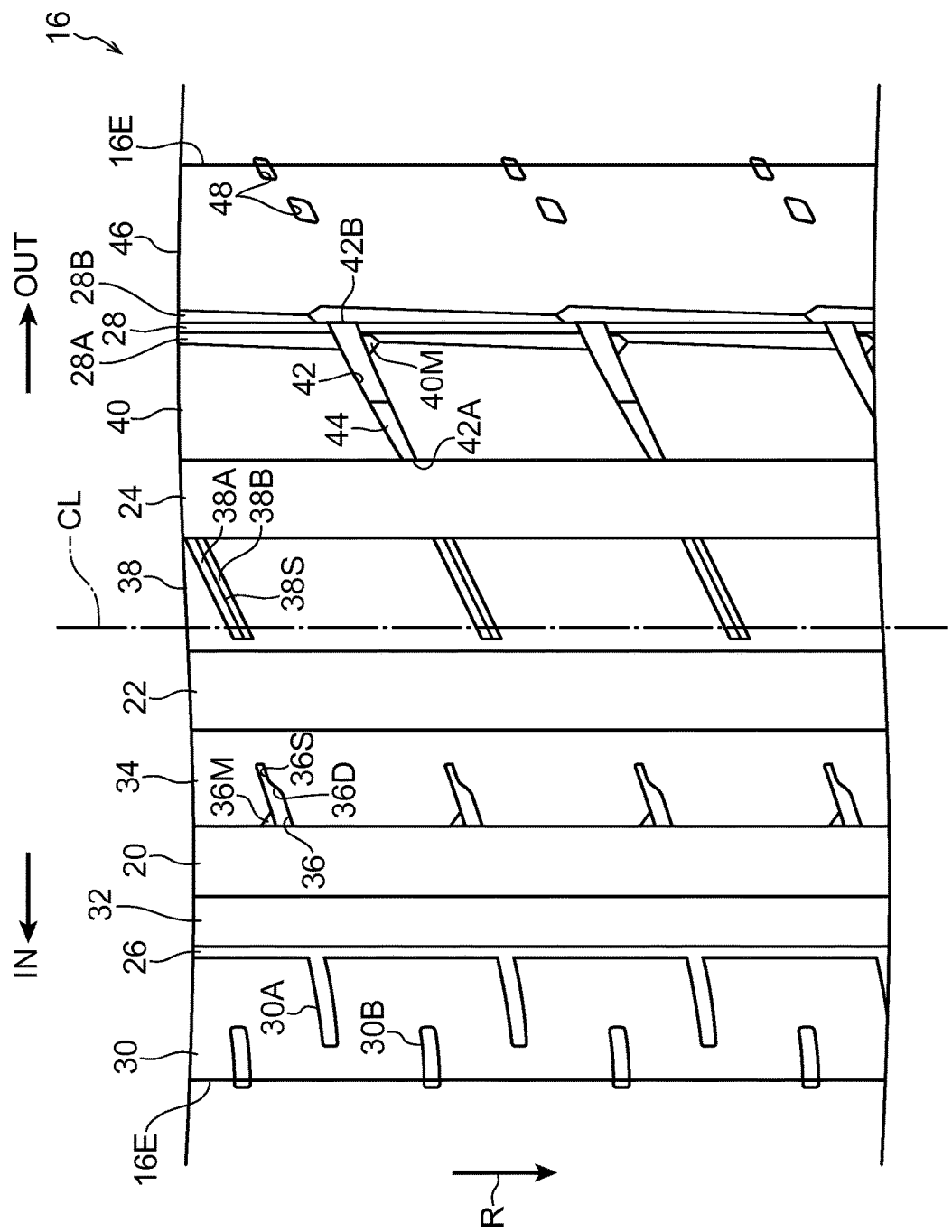

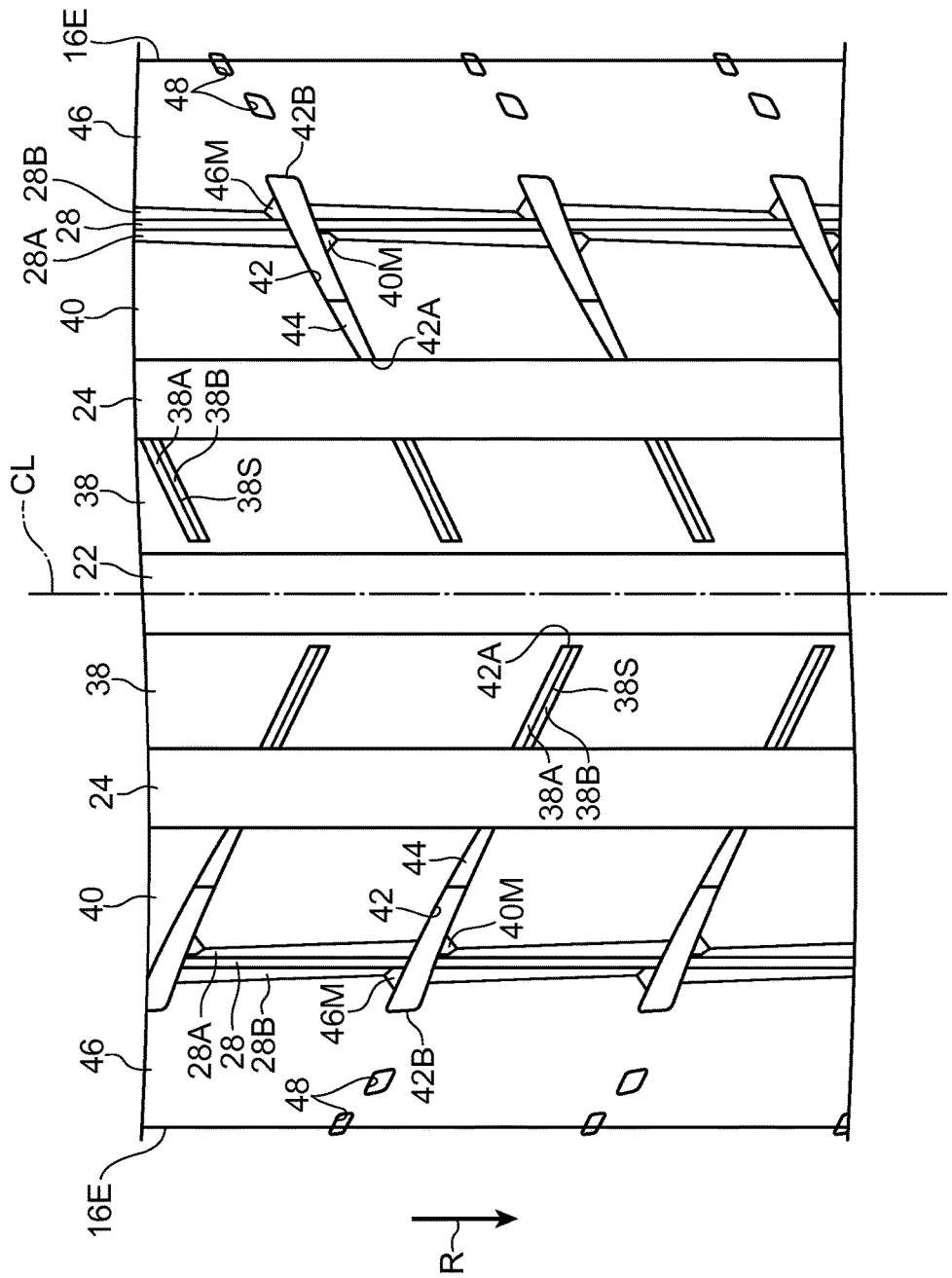

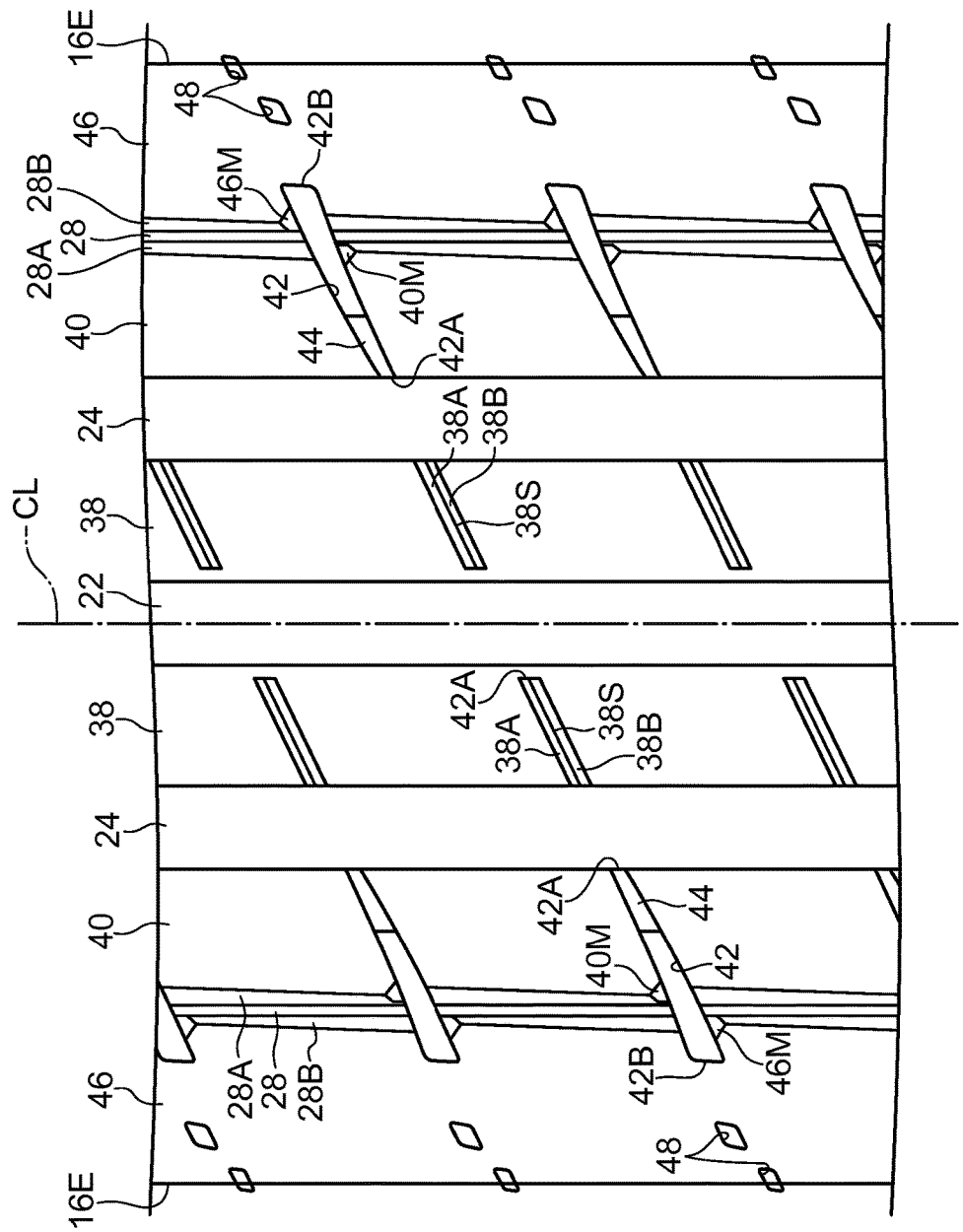

PNEUMATIC TIRE

CROSS REFERENCE TO RELATED APPLICATIONS

This application is a National Stage of International Application No. PCT/2012/083344 filed Dec. 21, 2012, claiming priority based on Japanese Patent Application Nos. 2011-286672 filed Dec. 27, 2011 and 2011-286674 filed Dec. 27, 2011, the contents of all of which are incorporated herein by reference in their entirety.

TECHNICAL FIELD

The present invention relates to a pneumatic tire, and particularly relates to a pneumatic tire featuring a tread pattern that is formed plurally in the tire circumference direction.

BACKGROUND ART

In general, at a pneumatic tire at a time of cornering, a ground contact pressure of the pneumatic tire is higher at the vehicle outer side than at the vehicle inner side. Therefore, to improve cornering characteristics, an increase in tread stiffness at a tire mounting outer side is called for. Meanwhile, it is also necessary to consider drainage characteristics during running on wet road surfaces. Accordingly, forming narrow circumference direction grooves at the tire mounting outer side relative to main drainage grooves has been proposed (for example, see Patent Documents 1 to 4).

However, drainage cannot be considered satisfactory from just the formation of narrow circumference direction grooves, and technologies to further improve drainage are being called for.

Patent Document 1: Japanese Patent Application Laid-Open (JP-A) No. 2009-006833
Patent Document 2: JP-A No. 2010-058781
Patent Document 3: JP-A No. 2000-043514
Patent Document 4: JP-A No. 2006-151029

DISCLOSURE OF INVENTION

Technical Problem

The present invention has been made in consideration of the situation described above, and an object of the invention is to provide a pneumatic tire that improves wet performance while assuring stiffness at the tire mounting outer side.

Solution to Problem

A pneumatic tire in accordance with a first aspect of the present invention includes: a plural number of circumference direction main grooves that are formed at a tread portion and extend in the tire circumference direction; an outer side rib that, when the tire is mounted at a vehicle, is formed at a tire outer side relative to the plural circumference direction main grooves, a land portion of the outer side rib being continuous in the tire circumference direction; and a lug groove that extends from an outermost side circumference direction main groove toward the outer side rib, the outermost side circumference direction main groove being formed furthest to the tire outer side when the tire is mounted at the vehicle, among the plural circumference direction main grooves, a groove width of the lug groove widening from the outermost side circumference direction main groove side thereof toward the outer side rib side, and the lug groove terminating further toward the outermost side circumference direction main groove side than a tire ground contact edge at the tire mounting outer side.

In the pneumatic tire according to the first aspect, the plural circumference direction main grooves extending in the tire circumference direction are formed in the tread. The outer side rib is formed at the side that is the tire outer side when the tire is mounted at a vehicle. The land portion of the outer side rib, at the tire ground contact edge side relative to the lug groove, is continuous in the tire circumference direction. Thus, stiffness is assured.

Herein, the inner side in the tire width direction when the tire is mounted at a vehicle (i.e., the vehicle inner side) is referred to as the "tire mounting inner side", and the outer side in the tire width direction when the tire is mounted at the vehicle (i.e., the vehicle inner side) is referred to as the "tire mounting outer side". Moreover, land portions are regions that are demarcated by grooves in the tread portion, including ribs and blocks.

Each lug groove extends toward the outer side rib from, of the plural circumference direction main grooves, the outermost side circumference direction main groove that is formed at the vehicle outermost side when the tire is mounted at a vehicle. The groove width of the lug groove widens from the outermost side circumference direction groove side thereof toward the outer side rib side. Therefore, water at the outer side rib side may be caught at the wider portion of the groove channel and flow toward the outermost side circumference direction main groove. Thus, drainage at the outer side rib may be improved. Because the lug groove terminates at the outermost circumference direction main groove side relative to the edge of the tire's ground contact, the outer side rib may be provided in a state in which the land portion at the tire mounting outer side thereof is continuous at the side at which the tire's equatorial plane is disposed relative to the tire ground contact edge that is at the tire mounting outer side. Thus, cornering performance may be effectively improved.

The pneumatic tire of the present invention may be applied to both tread patterns that are asymmetric between left and right, for which tire mounting inner and outer sides are specified, and to tread patterns with left-right symmetry.

In a pneumatic tire in accordance with a second aspect of the present invention, a groove floor raised portion is formed at the outermost side circumference direction main groove side of the lug groove, at which a groove floor is shallower than at the outer side rib side of the lug groove.

In the pneumatic tire according to the second aspect, the groove floor raised portion is formed at the outermost side circumference direction main groove side. The groove floor of the groove floor raised portion is shallower than the outer side rib side of the lug groove. Therefore, a decrease in stiffness of the land portion in which the lug groove is formed is suppressed, and stiffness of the land portion adjacent to the tire mounting outer side of the outermost side circumference direction main groove may be assured. Because a sufficient groove depth is provided at the outer side rib side of the lug groove, water may be captured at the outer side rib side and flow to the outermost side circumference direction main groove, and drainage at the outer side rib may be improved.

In a pneumatic tire in accordance with a third aspect of the present invention, the lug groove is angled relative to the tire width direction, corner portions that are configured between the lug groove and the outermost side circumference direction main groove include an acute corner and an obtuse corner, and the groove floor raised portion is angled such that the groove floor is shallower at a wall face side at which the acute corner is formed and deepens toward a wall face side at which the obtuse corner is formed.

When the lug groove is angled from the tire width direction, of the corner portions formed between the lug groove and the outermost side circumference direction main groove, one corner portion in the tire circumference direction is an acute corner and the other is an obtuse corner. Accordingly, to strengthen the stiffness of the corner portion at the acute corner side, the groove floor of the groove floor raised portion is made higher at the wall face side at which the acute corner side is formed. As a result, the stiffness at the acute corner side is higher and a difference in stiffnesses of the corner portions is moderated. Thus, uneven wear may be suppressed.

In a pneumatic tire in accordance with a fourth aspect of the present invention, a shoulder circumference direction narrow groove that extends in the tire circumference direction is formed further toward the outer side rib side relative to the outermost side circumference direction main groove, the shoulder circumference direction narrow groove being narrower in groove width and shallower in groove depth than the outermost side circumference direction main groove.

Because the shoulder circumference direction narrow groove is formed extending along the tire circumference direction at the outer side rib side relative to the outermost side circumference direction main groove, drainage may be further improved, and because the shoulder circumference direction narrow groove has a narrower groove width and a shallower groove depth than the outermost side circumference direction main groove, a decrease in tire stiffness at the outer side rib side of the tread portion may be suppressed.

In a pneumatic tire in accordance with a fifth aspect of the present invention, the lug groove and the shoulder circumference direction narrow groove intersect.

According to the structure described above, because the lug groove projects to the outer side rib side beyond the shoulder circumference direction narrow groove, water that is captured by the projecting portion of the lug groove that projects to the tire width direction outer side from the shoulder circumference direction narrow groove may be drained using both the shoulder circumference direction narrow groove and the outermost side circumference direction main groove. Thus, the water may be drained efficiently.

Advantageous Effects of Invention

As described hereabove, because the pneumatic tire recited in the first aspect has the described structure, drainage may be improved while stiffness at the vehicle outer side when the tire is mounted at a vehicle is assured.

Because the tire recited in the second aspect has the described structure, stiffness of the land portion adjacent to the vehicle outer side, when the tire is mounted at the vehicle, of the outermost side circumference direction main groove may be assured.

Because the tire recited in the third aspect has the described structure, stiffness at the acute corner side may be raised, a difference in stiffness between the corner portions may be moderated, and uneven wear may be suppressed.

Because the tire recited in the fourth aspect has the described structure, drainage may be further improved.

Because the tire recited in the fifth aspect has the described structure, water captured at the outer side rib side may be drained using both the shoulder circumference direction narrow groove and the outermost side circumference direction main groove, and the water may be drained efficiently.

BRIEF DESCRIPTION OF DRAWINGS

FIG. 7 is a plan view of the tread of a pneumatic tire in accordance with a third exemplary embodiment.

FIG. 8 is a plan view of the tread of a pneumatic tire in accordance with a fourth exemplary embodiment.

FIG. 9 is a plan view of the tread of a pneumatic tire in accordance with a fifth exemplary embodiment.

BEST MODE FOR CARRYING OUT THE INVENTION

Figure 1:
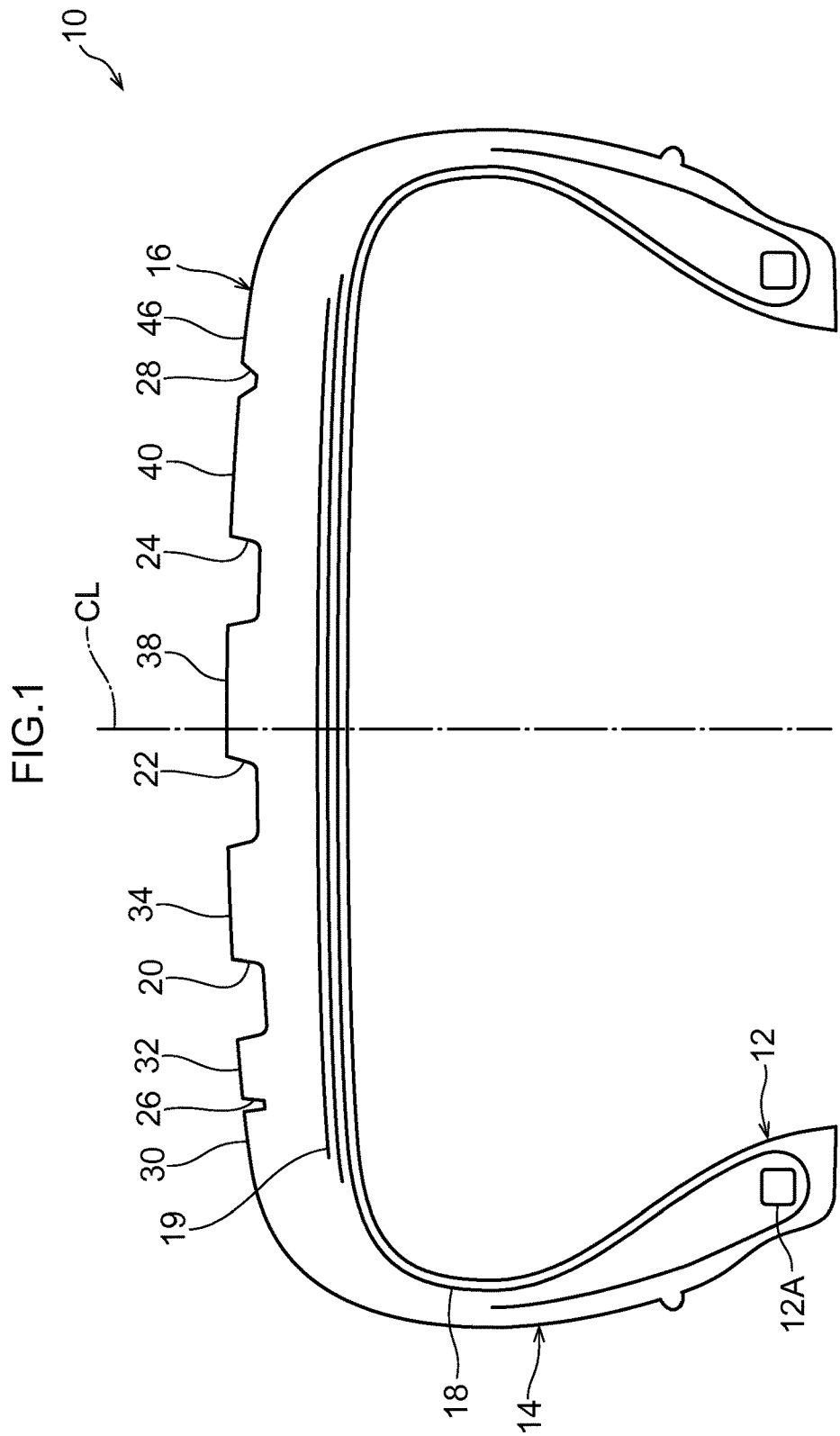
FIG. 1 is a sectional diagram, taken in a tire diametric direction, of a pneumatic tire in accordance with a first exemplary embodiment.

Herebelow, a pneumatic tire 10 in accordance with a first exemplary embodiment of the present invention is described in accordance with the attached drawings. In the drawings, the arrow IN indicates an inner side (hereinafter referred to as "the tire mounting inner side") when the tire is mounted at a vehicle (hereinafter referred to with the term "when the tire is mounted"), and an arrow OUT indicates the outer side when the tire is mounted (hereinafter referred to as "the tire mounting outer side"). The single-dot chain line CL indicates the equatorial plane of the tire.

As shown in FIG. 1, the pneumatic tire 10 according to the present exemplary embodiment includes a pair of bead portions 12, a pair of sidewall portions 14 and a tread portion 16. At least one annular bead core 12A is embedded at each bead portion 12. A carcass 18 is provided so as to extend in a toroidal shape between the pair of bead cores 12A. At each bead core 12A, the carcass 18 is folded back from the inner side to the outer side. A belt layer 19 is provided at the tire radial direction outer side of the carcass 18.

Figure 2:
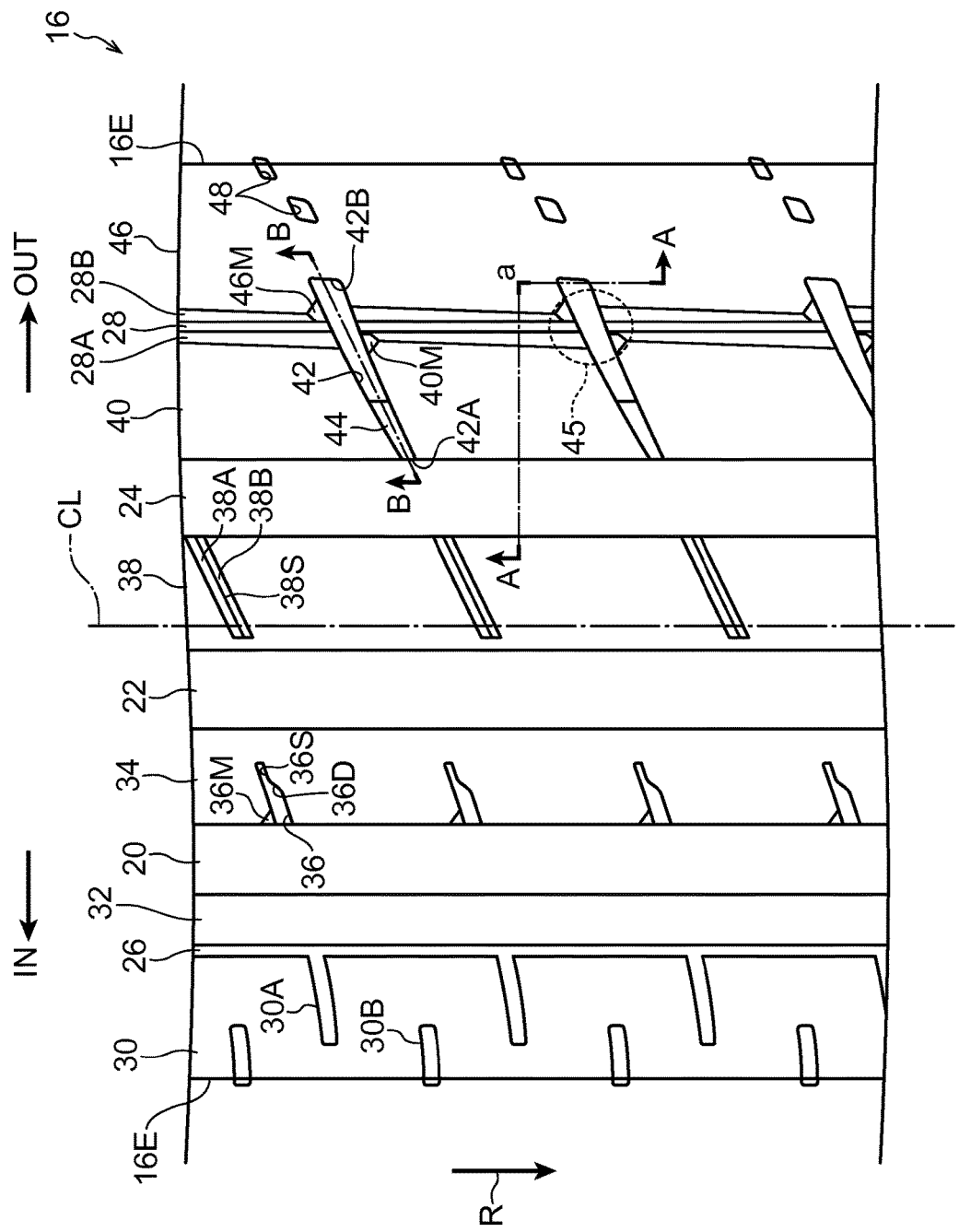
FIG. 2 is a plan view of the tread of the pneumatic tire in accordance with the first exemplary embodiment.

FIG. 2 shows the tread portion 16 of the pneumatic tire 10. Tire ground contact edges 16E of the tread portion 16 are the edges of ground contact when the pneumatic tire 10 is mounted to a standard rim complying with the JATMA YEAR BOOK (from the Japan Automobile Tire Manufacturers Association, 2011 edition), charged with air pressure to 100% of an air pressure (a maximum air pressure) corresponding with a maximum load performance (the bold text load in the table of internal pressure against load performance) for the application size-ply rating in the JATMA YEAR BOOK, and the tire is loaded with the maximum load performance. A usage ground or fabrication ground complies with the respective standards when the TRA (Tire and Rim Association) standards and the ETRTO (European Tyre and Rim Technical Organization) standards are applied.

The pneumatic tire 10 according to the present exemplary embodiment is formed with a pattern that is asymmetric between left and right about the tire equatorial plane CL. The pneumatic tire 10 is mounted such that the left side in the drawings is the tire mounting inner side and the right side in the drawings is the tire mounting outer side. The pneumatic tire 10 is preferably mounted such that the tire turning direction is the direction indicated by arrow R (such that the lower side in the drawings is the contact patch entry side and the upper side is the contact patch exit side). The pneumatic tire 10 does not necessarily have to be mounted with the tire turning direction in the direction described above and may be mounted with the front and rear directions reversed.

An innermost side circumference direction main groove 20, a central circumference direction main groove 22 and an outermost side circumference direction main groove 24 are formed in the tread portion 16 of the pneumatic tire 10 according to the present exemplary embodiment, to serve as a plural number (three in the present exemplary embodiment) of circumference direction main grooves extending in the tire circumference direction.

Of the three circumference direction main grooves, the innermost side circumference direction main groove 20 is formed closest to the tire mounting inner side. The central circumference direction main groove 22 is formed at the tire mounting outer side relative to the innermost side circumference direction main groove 20 and at the tire mounting inner side relative to the tire equatorial plane CL. The outermost side circumference direction main groove 24 is formed at the tire mounting outer side relative to the central circumference direction main groove 22 and at the tire mounting outer side relative to the tire equatorial plane CL.

An inner side circumference direction narrow groove 26 is formed at the tire mounting inner side relative to the innermost side circumference direction main groove 20. The inner side circumference direction narrow groove 26 is formed with a narrower groove width and a shallower groove depth than the innermost side circumference direction main groove 20.

A shoulder circumference direction narrow groove 28 is formed at the tire mounting outer side relative to the outermost side circumference direction main groove 24. A groove width W3 of a groove floor of the shoulder circumference direction narrow groove 28 is formed to be narrower than a groove width W0 of the outermost side circumference direction main groove 24. A groove depth H3 of the shoulder circumference direction narrow groove 28 is formed to be shallower than a groove depth H0 of the outermost side circumference direction main groove 24. Groove walls 28A and 28B that structure the shoulder circumference direction narrow groove 28 form angles with the groove floor that are greater than 90°. Therefore, the groove width of the shoulder circumference direction narrow groove 28 widens from the groove floor to the tread surface. A wall face angle α of the groove wall 28A (an angle between the groove floor and the groove wall 28; see FIG. 4) is larger at the contact patch entry side thereof than at the contact patch exit side, as shown in FIG. 2. Thus, an edge line between a fourth rib 40 and the groove wall 28A is angled to the tire width direction outer side from the contact patch entry side toward the contact patch exit side. A wall face angle β of the groove wall 28B (see FIG. 4) is larger at the contact patch exit side thereof than at the contact patch entry side. Thus, an edge line between the fourth rib 40 and the groove wall 28B is angled to the tire width direction inner side from the contact patch entry side toward the contact patch exit side.

The shoulder circumference direction narrow groove 28 differs from the three circumference direction main grooves (the innermost side circumference direction main groove 20, the central circumference direction main groove 22 and the outermost side circumference direction main groove 24) in the groove width being narrower than those of the circumference direction main grooves and the groove depth being shallower.

An inner side rib 30 is formed at the shoulder side of the tread portion 16 relative to the inner side circumference direction narrow groove 26. First lug grooves 30A are formed in the inner side rib 30. Each first lug groove 30A opens into the inner side circumference direction narrow groove 26, extends in the tire width direction from the inner side circumference direction narrow groove 26 toward the shoulder side at the tire mounting inner side, and has a constant width. The first lug groove 30A terminates at the tire equatorial plane CL side relative to the tire ground contact edge 16E at the tire mounting inner side. Second lug grooves 30B are also formed in the inner side rib 30. Each second lug groove 30B is disposed away from the inner side circumference direction narrow groove 26, extends in the tire width direction, and has a constant width. The second lug groove 30B extends across the tire ground contact edge 16E and is formed between two of the first lug grooves 30A in the tire circumference direction. The first lug grooves 30A and second lug grooves 30B are disposed so as to partially overlap with one another as viewed in the tire circumference direction. Thus, no land portion that is continuous in a straight line in the tire circumference direction is formed at the inner side rib 30.

A first rib 32 is formed between the inner side circumference direction narrow groove 26 and the innermost side circumference direction main groove 20. No groove is formed in the first rib 32. The first rib 32 is formed with a rib width narrower than the widths of other ribs formed in the tread portion 16.

A second rib 34 is formed between the innermost side circumference direction main groove 20 and the central circumference direction main groove 22. Second lug grooves 36 are formed in the second rib 34. Each second lug groove 36 opens into the innermost side circumference direction main groove 20, and extends from the innermost side circumference direction main groove 20 toward the central circumference direction main groove 22 side. The second lug groove 36 does not open into the central circumference direction main groove 22 but terminates within the second rib 34. Thus, a land portion that is continuous in a straight line in the tire circumference direction is formed at the side of the second rib 34 that is closer to the tire equatorial plane CL.

The second lug groove 36 is angled a little with respect to the tire width direction. Of corner portions formed between the innermost side circumference direction main groove 20 and each second lug groove 36, an acute corner side (in FIG. 2, the upper side of the second lug groove 36) is chamfered, forming a chamfer portion 36M. The groove width of the second lug groove 36 is narrower at the central circumference direction main groove 22 side thereof than at the innermost side circumference direction main groove 20 side. Thus, a distal end portion 36S is formed. The distal end portion 36S is structured with a narrow width by the formation of a curved step portion 36D in the groove wall at the side at which the chamfer portion 36M is not formed. The curved step portion 36D is formed in a curved shape that smoothly links the corner portion with the distal end portion 36S. The groove floor of the second lug groove 36 is deepest at the innermost side circumference direction main groove 20 side thereof, gradually becoming shallower toward the distal end portion 36S side.

A third rib 38 is formed between the central circumference direction main groove 22 and the outermost side circumference direction main groove 24. The tire equatorial plane CL is located in the third rib 38, at the central circumference direction main groove 22 side thereof. Sipes 38S are formed in the third rib 38. Each sipe 38S opens into the outermost side circumference direction main groove 24, and extends from the outermost side circumference direction main groove 24 towards the central circumference direction main groove 22 side. The groove width of the sipe 38S is closed up by ground contact. At the groove walls that structure the sipe 38S, upper portions of the groove walls are chamfered along the sipe 38S, forming chamfer portions 38A and 38B. The sipe 38S does not open into the central circumference direction main groove 22 but is terminated within the third rib 38. Thus, a land portion is formed that is continuous in a straight line in the tire circumference direction, at an edge portion of the third rib 38 at the side thereof that is closer to the tire equatorial plane CL.

The fourth land portion 40 is formed between the outermost side circumference direction main groove 24 and the shoulder circumference direction narrow groove 28. An outer side rib 46 is formed at the tire mounting outer side tire ground contact edge 16E side relative to the fourth land portion 40. Fourth lug grooves 42 are formed in the fourth land portion 40, extending from the outermost side circumference direction main groove 24 toward the tire mounting outer side. Each fourth lug groove 42 has a straight-line shape, and one end 42A thereof opens into the outermost side circumference direction main groove 24. The fourth lug groove 42 cuts across the shoulder circumference direction narrow groove 28 and the other end thereof (hereinafter referred to as a terminal portion 42B) extends into the outer side rib 46. The one end 42A of the fourth lug groove 42 is disposed on a line of extension from the sipe 38S. The fourth lug grooves 42 are angled in the same direction and by the same amount as the sipes 38S, structuring a design such that the fourth lug grooves 42 continue from the sipes 38S with the outermost side circumference direction main groove 24 therebetween.

Figure 3:
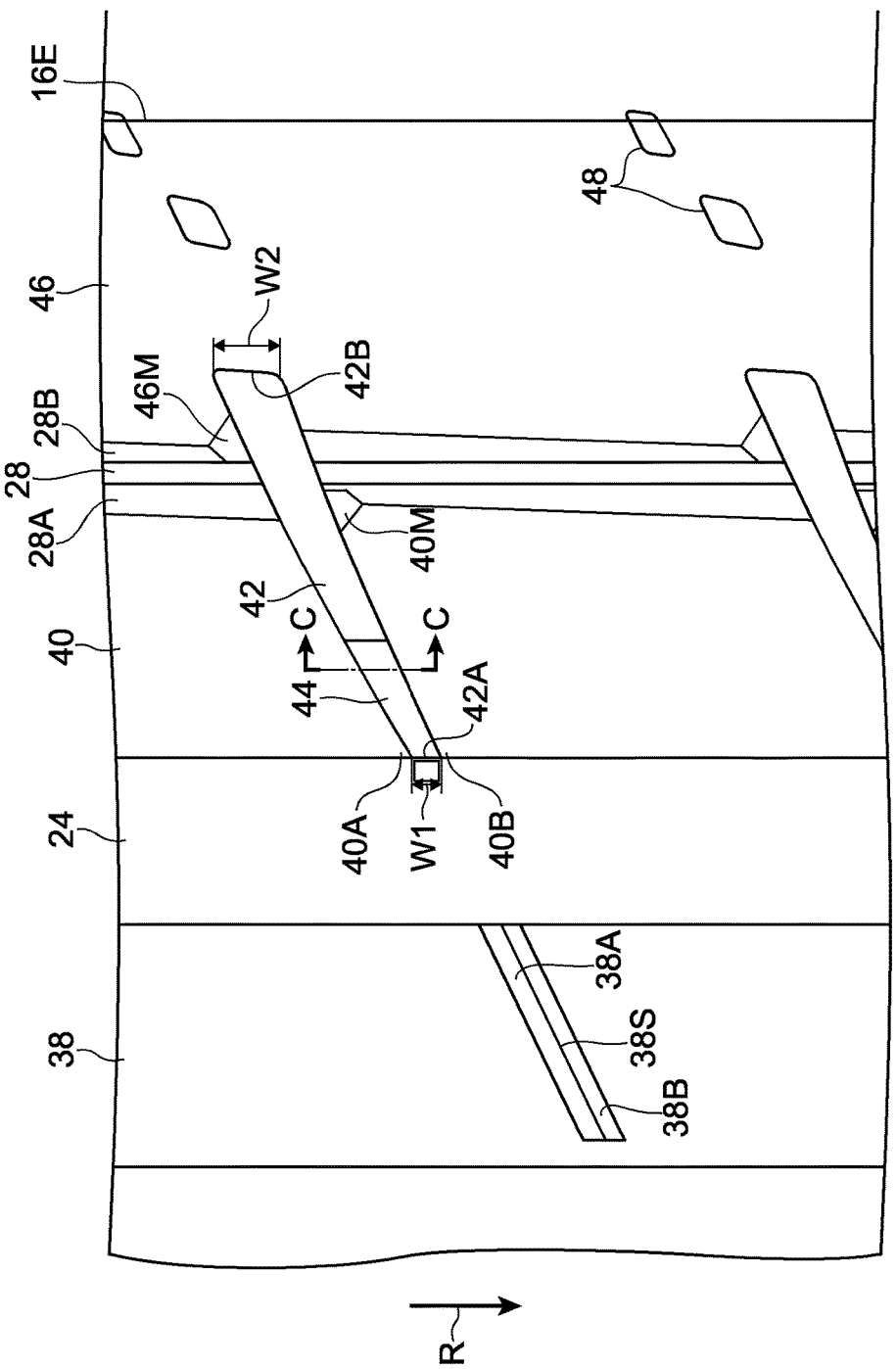
FIG. 3 is a partial enlarged plan view of the tread of the pneumatic tire in accordance with the first exemplary embodiment.

Each fourth lug groove 42 intersects with the shoulder circumference direction narrow groove 28 and terminates at the terminal portion 42B within the outer side rib 46. The terminal portion 42B is disposed at the tire equatorial plane CL side relative to the mounted tire outer side tire ground contact edge 16E. The outer side rib 46 includes a land portion that is continuous in a straight line in the tire circumference direction. As shown in FIG. 3, the groove width of the fourth lug groove 42 is narrowest, at W1, at the one end 42A that is the portion opening into the outermost side circumference direction main groove 24, and is widest, at W2, at the terminal portion 42B within the outer side rib 46. Thus, the fourth lug groove 42 is formed so as to gradually widen from the one end 42A to the terminal portion 42B.

Figure 4:
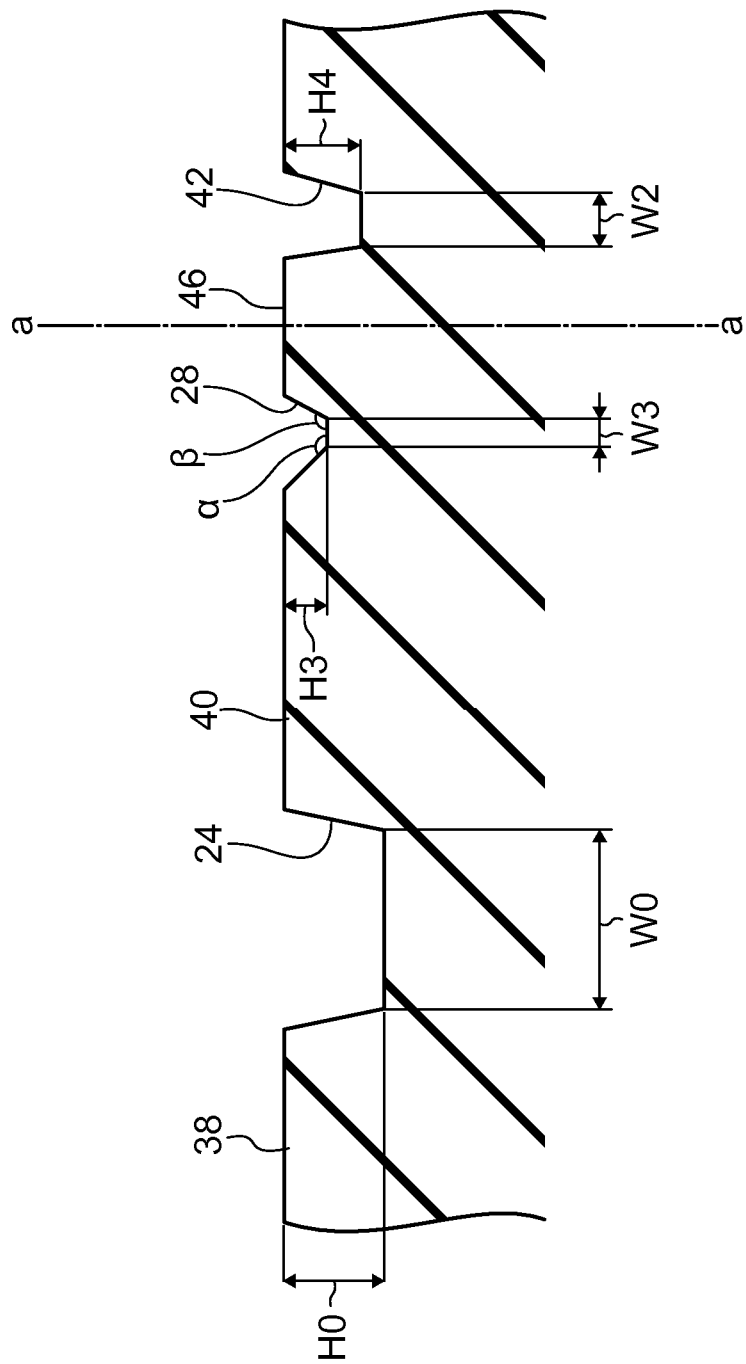
FIG. 4 is a sectional diagram taken along line A-A in FIG. 2.

As shown in FIG. 4, a groove depth H4 of the fourth lug groove 42 is shallower than the groove depth H0 of the outermost side circumference direction main groove 24 but deeper than the groove depth H3 of the shoulder circumference direction narrow groove 28. At an intersection portion 45 at which the fourth lug groove 42 and the shoulder circumference direction narrow groove 28 intersect (see FIG. 2), the groove depth is H4. Thus, the groove floor of the shoulder circumference direction narrow groove 28 is deeper at the intersection portion 45 than at other portions of the shoulder circumference direction narrow groove 28. In FIG. 4, the tire ground contact area is schematically shown in a plan view for ease of comparison of the groove depths.

Figure 5:
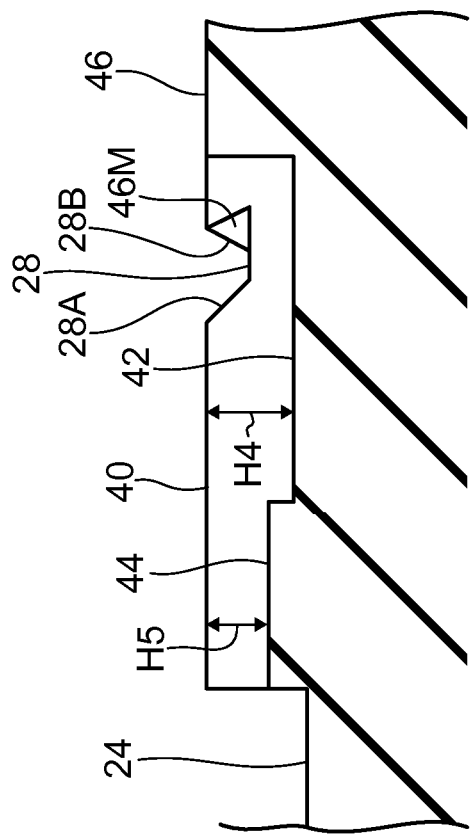
FIG. 5 is a sectional diagram taken along line B-B in FIG. 2.

As shown in FIG. 5, a groove floor raised portion 44 at which the floor of the groove is raised is formed at the one end 42A side of the fourth lug groove 42. The groove depth of the groove floor raised portion 44 is shallower than the groove depth H4 of the fourth lug groove 42. The groove floor raised portion 44 is formed from the one end 42A to an edge at a central vicinity of the fourth land portion 40. In FIG. 5 too, the tire ground contact area is schematically shown in a plan view for ease of comparison of the groove depths.

Respective chamfer portions 40M and 46M are formed at the fourth land portion 40 and the outer side rib 46. The chamfer portions 40M and 46M are formed at, of the corner portions of the intersection portion 45 formed between the fourth lug groove 42 and the shoulder circumference direction narrow groove 28, the sides that are acute corners.

Wear indicators 48 are formed at portions of the outer side rib 46 on lines of extension from the fourth lug grooves 42. Each wear indicator 48 is formed apart from the terminal portion 42B of the fourth lug groove 42 and is structured by two holes. A wear state of the outer side rib 46 may be learned from the wear indicators 48, separately from usual wear indicators that are provided at tire circumference direction main grooves.

Now, operation of the pneumatic tire 10 according to the present exemplary embodiment is described.

In the pneumatic tire 10 according to the present exemplary embodiment, because the innermost side circumference direction main groove 20, the central circumference direction main groove 22 and the outermost side circumference direction main groove 24 are formed in the tread portion 16, basic drainage and linear stability during dry and wet running are assured.

In the tread portion 16 of the pneumatic tire 10 according to the present exemplary embodiment, the outer side rib 46 that is disposed at the tire mounting outer side is a continuous land portion in the tire circumference direction. Therefore, stiffness at the tire mounting outer side is assured, and cornering performance may be enhanced. Moreover, because the fourth lug grooves 42 that extend to the outer side rib 46 are terminated before reaching the tire ground contact edge 16E, stiffness of the outer side rib 46 may be effectively assured. The groove width of each fourth lug groove 42 reaches the maximum of W2 within the outer side rib 46. Therefore, water at the outer side rib 46 side may be captured in the portion with the wider groove width and flow to the outermost side circumference direction main groove 24, and drainage at the outer side rib 46 side may be improved.

Because the groove floor raised portion 44 is formed at the one end 42A side of each fourth lug groove 42, stiffness of the fourth land portion 40 may be maintained while drainage is assured. Moreover, because the groove floor raised portion 44 is formed at the one end 42A side, the groove depth at the tire mounting outer side may be assured, and large amounts of water may be captured at the tire mounting outer side.

In the pneumatic tire 10 according to the present exemplary embodiment, because the shoulder circumference direction narrow groove 28 is formed adjacent to the outer side rib 46, the outer side rib 46 may be drained by the shoulder circumference direction narrow groove 28 and drainage may be improved. Meanwhile, because the shoulder circumference direction narrow groove 28 has a narrower groove width than the outermost side circumference direction main groove 24 and a narrower groove width than the outermost side circumference direction main groove 24 and the fourth lug grooves 42, a decrease in stiffness of the outer side rib 46 may be suppressed.

Buckling during cornering may also be suppressed by the formation of the shoulder circumference direction narrow groove 28. The meaning of the term "buckling" herein includes a phenomenon in which, during cornering, a tire starts to collapse to the outer side and the tread surface lifts up from the road surface at a point close to the tire mounting outer side ground contact edge, and ground contact pressure is lost at the tire mounting inner side. In the pneumatic tire 10 according to the present exemplary embodiment, because the shoulder circumference direction narrow groove 28 is formed, bending stiffness of the tread surface is reduced. Therefore, the tire mounting inner side, particularly the land portion 40, more easily makes ground contact, and a decrease in gripping force at the tire mounting inner side may be suppressed.

In the present exemplary embodiment, because the sipes 38S are formed in the third rib 38, uneven wear at the rib end of the third rib 38 that is at the side further from the tire equatorial plane CL may be suppressed. That is, because the rib end of the third rib 38 at the outermost side circumference direction main groove 24 side is further from the tire equatorial plane CL, the length of the tire circumference thereat is smaller and dragging is more likely to occur. However, because the sipes 38S that open into the outermost side circumference direction main groove 24 are formed, dragging is suppressed and uneven wear may be suppressed. Because the sipes 38S do not open into the central circumference direction main groove 22, a land portion that is continuous in a straight line in the tire circumference direction can be formed. Therefore, stiffness at the side of the third rib 38 that is closer to the tire equatorial plane CL may be assured, and control stability may be maintained. Because the chamfer portions 38A and 38B are formed along the sipes 38S, chunking at the front and rear of the sipes 38S in the tire circumference direction, such as rubber being fragmented or detached and the like, may be suppressed.

In the present exemplary embodiment, because the second lug grooves 36 are formed in the second rib 34, drainage may be enhanced. Because each second lug groove 36 has a narrower groove width and a shallower groove depth at the tire equatorial plane CL side thereof, stiffness at the side with higher ground contact pressure may be maintained, and the production of chunks may be suppressed. Because the chamfer portions 36M are formed at the acute corner sides of the corner portions formed between the innermost side circumference direction main groove 20 and the second lug grooves 36, chunking at these corner portions, such as rubber being fragmented or detached and the like, may be suppressed. The second lug grooves 36 open into the innermost side circumference direction main groove 20 at the side further from the tire equatorial plane CL. In general, the length of the tire circumference in a tread portion is longer and the tire ground contact pressure is higher closer to the tire equatorial plane CL. Therefore, dragging at the rib end of the second rib 34 that is at the side further from the tire equatorial plane may be suppressed, and uneven wear may be suppressed. Because the second lug grooves 36 do not open into the central circumference direction main groove 22, a land portion that is continuous in a straight line in the tire circumference direction is formed at the rib end at the central circumference direction main groove 22 side of the second rib 34. Therefore, stiffness is assured at the side closer to the tire equatorial plane CL, and control stability may be maintained.

In the present exemplary embodiment, the respective chamfer portions 40M and 46M are formed at the acute corner sides of the corner portions of the intersection portions 45 between the fourth lug grooves 42 and the shoulder circumference direction narrow groove 28. Therefore, chunking at these corner portions, such as rubber being fragmented or detached and the like, may be suppressed.

Figure 6:
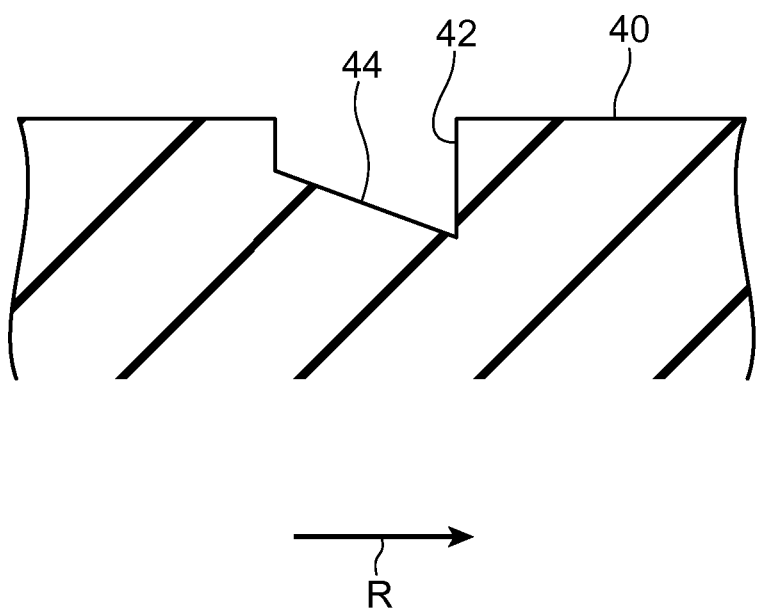
FIG. 6 is a sectional diagram, at the position of line C-C in FIG. 3, of a pneumatic tire in accordance with a second exemplary embodiment.

Now, the groove floor raised portion 44 formed at the outermost side circumference direction main groove 24 side of each fourth lug groove 42 has a uniform depth, but may be a structure that is angled in the tire circumference direction, as illustrated by a second exemplary embodiment in FIG. 6. That is, considering the acute corner side of the corner portions formed at the fourth land portion 40 between each fourth lug groove 42 and the outermost side circumference direction main groove 24 (herebelow, the acute corner side corner portion is referred to as "the acute corner portion 40A" and the obtuse corner side corner portion is referred to as "the obtuse corner portion 40B"), the groove floor raised portion 44 may be structured to be inclined such that the groove floor is shallower at the wall face side at which the acute corner portion 40A is formed than at the wall face side at which the obtuse corner portion 40B is formed and such that the groove floor becomes deeper toward the wall face side at which the obtuse corner portion 40B is formed. Accordingly, because the groove floor of the groove floor raised portion 44 is shallower at the wall face side at which the acute corner portion 40A is formed, a decrease in stiffness at the acute corner portion 40A may be suppressed. As a result, a difference in stiffnesses between the acute corner portion 40A and the obtuse corner portion 40B may be moderated and uneven wear of the corner portions may be suppressed.

In the present exemplary embodiment, the shoulder circumference direction narrow groove 28 is formed. However, a structure without the shoulder circumference direction narrow groove 28 may be formed.

In the present exemplary embodiment, a structure is described in which each fourth lug groove 42 intersects the shoulder circumference direction narrow groove 28 and reaches the outer side rib 46. However, the fourth lug groove 42 does not necessarily have to intersect with the shoulder circumference direction narrow groove 28. As illustrated by a third exemplary embodiment in FIG. 7, a structure is possible in which each fourth lug groove 42 opens only into the shoulder circumference direction narrow groove 28 and does not project to the outer side rib 46 side. A structure is also possible in which the fourth lug groove 42 terminates within the fourth land portion 40 before reaching the shoulder circumference direction narrow groove 28.

In the exemplary embodiments described above, each fourth lug groove 42 is angled with respect to the tire width direction, but does not necessarily have to be angled with respect to the tire width direction. The fourth lug groove 42 may be disposed to be parallel with the tire width direction.

In the present exemplary embodiments, an example is described in which the groove width of each fourth lug groove 42 widens to a maximum at the tire width direction outermost side end. However, it is sufficient if the fourth lug groove 42 has a shape in which the groove width widens towards the tire width direction outer side and can capture large amounts of water at the outer side rib 46 side. That is, in a relatively short region at the tire width direction outermost side end portion thereof, the groove width may be a uniform width or the groove width may narrow.

In the present exemplary embodiment, an example is described in which the tread pattern is asymmetric between left and right. However, the present invention may be applied to a tread pattern with left-right symmetry. In this case, as illustrated by a fourth exemplary embodiment in FIG. 8, a structure may be formed in which the region of the tread portion 16 at the right side in FIG. 2 relative to the central circumference direction main groove 22 is also provided at the left side, shifted in the tire circumference direction by half a pitch from mirror symmetry. The tire equatorial plane CL is disposed at the middle of the central circumference direction main groove 22. Further yet, as illustrated by a fifth exemplary embodiment in FIG. 9, a structure may be formed in which the region of the tread portion 16 at the right side in FIG. 2 relative to the central circumference direction main groove 22 is provided at the left side in rotational symmetry.

As described hereabove, when a tread pattern with left-right symmetry is formed, stiffness at the tire mounting inner side is raised in the same manner as at the tire mounting outer side. When a tread pattern that is asymmetric between left and right is formed, as in the first exemplary embodiment, an increase in stiffness at the tire mounting inner side, particularly in a vehicle in which negative camber is applied, is not excessive. Hence, because it is easier to switch the steering, a sense of control during running at relatively low speeds is improved.

The invention claimed is:

1. A pneumatic tire, comprising:
a plurality of circumference direction main grooves that are formed at a tread portion and extend in the tire circumference direction;
an outer side rib that, when the tire is mounted at a vehicle, is formed at a tire mounting outer side relative to the plurality of circumference direction main grooves, a land portion of the outer side rib being continuous in the tire circumference direction;
a lug groove that extends from an outermost side circumference direction main groove toward the outer side rib, the outermost side circumference direction main groove being formed furthest to the tire mounting outer side, when the tire is mounted at the vehicle, among the plurality of circumference direction main grooves, a groove width of the lug groove continuously widening over substantially an entire length of the lug groove in a tire width direction, from the outermost side circumference direction main groove side thereof toward the outer side rib side, and the lug groove terminating in the outer side rib and terminating further toward the outermost side circumference direction main groove side than a tire ground contact edge at the tire mounting outer side; and
a shoulder circumference direction narrow groove extending in the tire circumference direction and being provided at the tire mounting outer side relative to the outermost side circumference direction main groove, the shoulder circumference direction narrow groove being narrower in groove width and shallower in groove depth than the outermost side circumference direction main groove,
wherein the lug groove and the shoulder circumference direction narrow groove intersect,
wherein the lug groove includes a groove floor raised portion provided at an outermost side circumference direction main groove side of the lug groove, at which a groove floor is shallower than at an outer side rib side opposite to the outermost side circumference direction main groove side of the lug groove,
wherein the groove floor raised portion extends from a first end of the lug groove in the tire width direction toward a center portion of a second land portion provided between the outermost side circumference direction main groove and the shoulder circumference direction narrow groove,
wherein a first end of the groove floor raised portion is located at the first end of the lug groove in the tire width direction and a second end opposite to the first end of the groove floor raised portion ends at the center portion of the second land portion,
wherein the lug groove continuously extends from the second end of the groove floor raised portion through the shoulder circumference direction narrow groove into the outer side rib,
wherein a side wall of the outermost side circumference direction main groove is flush with the groove floor raised portion,
wherein a first width of the lug groove measured at an outer side end of the groove floor raised portion is larger than a second width of the lug groove measured at the side wall of the outermost side circumference direction main groove being flush with the groove floor raised portion,
wherein the lug groove is only formed at the tire mounting outer side of the outermost side circumference direction main groove, and
wherein the pneumatic tire does not have an additional lug groove configured the same as the lug groove, which is located on an opposite side of the tire mounting outer side with respect to an equator of the pneumatic tire.

2. The pneumatic tire according to claim 1, wherein the lug groove is angled relative to the tire width direction, corner portions that are configured between the lug groove and the outermost side circumference direction main groove include an acute corner and an obtuse corner, and the groove floor raised portion is angled such that the groove floor is shallower at a wall face side at which the acute corner is formed and deepens toward a wall face side at which the obtuse corner is formed.

3. The pneumatic tire according to claim 1, wherein the shoulder circumference direction narrow groove includes:
a groove floor; and
a first groove wall and a second groove wall extending radially from the groove floor, and
wherein each angle formed between the groove floor and each of the first and second groove walls is greater than 90°.

4. The pneumatic tire according to claim 1, wherein the shoulder circumference direction narrow groove includes:
a groove floor; and
a first groove wall and a second groove wall extending radially from the groove floor,
wherein a first angle formed between the groove floor and the first groove wall is larger at a first side, along a tire circumferential direction, corresponding to a contact patch entry side of the shoulder circumference direction narrow groove than at a second side, along the tire circumferential direction, opposite to the first side of the shoulder circumference direction narrow groove, the second side corresponding to a contact patch exit side of the shoulder circumference direction narrow groove, and wherein a second angle formed between the groove floor and the second groove wall is larger at the second side corresponding to the contact patch exit side of the shoulder circumference direction narrow groove than at the first side corresponding to the contact patch entry side of the shoulder circumference direction narrow groove.

5. The pneumatic tire according to claim 1, wherein a depth of the lug groove at an intersection of the lug groove and the shoulder circumference direction narrow groove is deeper than a depth of the shoulder circumference direction narrow groove, and a depth of the lug groove at an intersection of the lug groove and the outermost side circumference direction main groove is shallower than a depth of the outermost side circumference direction main groove.

\* \* \* \* \*